United States Patent
Ehrmann et al.

(10) Patent No.: US 8,924,179 B2
(45) Date of Patent: Dec. 30, 2014

(54) ASSEMBLY AND METHOD FOR DETERMINING AN ANGULAR POSITION

(75) Inventors: Martin Ehrmann, Nuremberg (DE); Bernhard Wagner, Nuremberg (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 467 days.

(21) Appl. No.: 13/255,145

(22) PCT Filed: Jul. 7, 2010

(86) PCT No.: PCT/EP2010/059689
§ 371 (c)(1),
(2), (4) Date: Sep. 7, 2011

(87) PCT Pub. No.: WO2011/003928
PCT Pub. Date: Jan. 13, 2011

(65) Prior Publication Data
US 2012/0209562 A1    Aug. 16, 2012

(30) Foreign Application Priority Data

Jul. 7, 2009 (DE) .......................... 10 2009 032 095

(51) Int. Cl.
*G01D 5/20*    (2006.01)
(52) U.S. Cl.
CPC .................................. *G01D 5/2073* (2013.01)
USPC ........................................................ 702/151
(58) Field of Classification Search
CPC .................................................. G01D 5/2073
USPC ........................................................ 702/151
See application file for complete search history.

(56) References Cited

U.S. PATENT DOCUMENTS

| 2,496,920 | A  | * | 2/1950  | Seeley ............................ 307/27 |
| 5,646,496 | A  | * | 7/1997  | Woodland et al. ............ 318/632 |
| 5,796,357 | A  | * | 8/1998  | Kushihara ..................... 341/116 |
| 6,191,550 | B1 | * | 2/2001  | Yoshihara ..................... 318/661 |
| 6,278,388 | B1 | * | 8/2001  | Kushihara ..................... 341/112 |
| 6,426,712 | B1 | * | 7/2002  | Hare et al. .................... 341/116 |
| 2002/0175645 | A1 | * | 11/2002 | Fujimoto et al. .............. 318/254 |

FOREIGN PATENT DOCUMENTS

| DE | 29519716 U1 | 1/1996 |
| DE | 10162196 A1 | 12/2002 |
| EP | 0779607 A1  | 6/1997 |
| GB | 2448350 A   | 10/2008 |

OTHER PUBLICATIONS

Gasking, "Resolver-to-digital Conversion—A Simple and Cost Effective Alternative to Optical Shaft Encoders", 2002-2006, Analog Devices, Application Note AN-263 pp. 1-4; http://www.analog.com/static/imported-files/application_notes/394309286AN263.pdf.*

* cited by examiner

*Primary Examiner* — Jonathan C Teixeira Moffat
*Assistant Examiner* — Regis Betsch
(74) *Attorney, Agent, or Firm* — Laurence A. Greenberg; Werner H. Stemer; Ralph E. Locher

(57) ABSTRACT

An assembly and a method determine the angular position of a rotating machine by way of an inductive sensor. From the excitation signal for a primary winding of a sensor and voltages induced in the two secondary windings of the sensor, three more signals are derived using phase shifters and polarity sign determination units. The six signals in total are sampled using a sample and hold sampling unit and provided to a processor for evaluation, which then calculates the current angular position of the rotating machine at the sampling time.

12 Claims, 3 Drawing Sheets

ASSEMBLY AND METHOD FOR DETERMINING AN ANGULAR POSITION

BACKGROUND OF THE INVENTION

Field of the Invention

The invention relates to an assembly and a method for determining the angular position of a rotating object, for example.

The angular position for example of a rotating machine is often recorded by using a sensor, which by means of inductive coupling forms, from a temporally varying periodic input value, two output values dependent on the angular position of the for example rotating electrical machine, the amplitudes of the time-periodic output values depending in different ways on the angular position to be recorded. Preferred technical embodiments of such sensors are for example resolvers or variable-reluctance (VR) sensors, in which an excitation usually occurs by means of a temporally sinusoidal electrical signal, and the amplitudes of the two likewise temporally sinusoidal output signals are modulated, dependent on the angular position to be recorded, on the one hand sinusoidally for example, and on the other hand cosinoidally (as for example for resolvers with secondary windings arranged turned through 90 degrees to each other).

The sinusoidal voltage on the first secondary winding is calculated here as $$U_s(t) = a \cdot U_0 \cdot \sin(w_e \cdot t + \beta) \cdot \sin(\alpha), \text{ and}$$

the cosinusoidal voltage on the second secondary winding is calculated as $$U_c(t) = a \cdot U_0 \cdot \sin(w_e \cdot t + \beta) \cdot \cos(\alpha), \text{ where}$$

$w_e$ is the exciter circuit frequency, t the time, $U_0$ the excitation amplitude, $\alpha$ the rotation angle of the machine, $\beta$ the phase angle between excitation and the taps on the secondary coils, and a the transfer factor of the amplitude between the primary winding and the secondary windings.

By evaluation of the sensor voltages, the required angle $\alpha$ is determined from the values $U_S(t)$ and $U_C(t)$ measured on the secondary windings. Here:

$$U_S(t)/U_C(t) = \sin(\alpha)/\cos(\alpha) = \tan(\alpha),$$

which yields the current rotation angle $\alpha$. A disadvantage here is that this approach only leads to suitable results if sin ($w_e \cdot t + \beta$) is not close to the zero crossing. If sin ($w_e \cdot t + \beta$) is close to the zero crossing, then $U_s(t)$ and $U_c(t)$ take on very small values or tend to zero, and a suitable evaluation is no longer possible for this angular position.

One solution possibility according to the present state of the art is to choose a sampling time for the two output signals of the secondary windings such that sin ($w_e \cdot t + \beta$) takes on a sufficiently large value. A consequent disadvantage is that the time for determining the angular position can therefore no longer be freely selected, but must be executed in a particular phase relationship (and hence in a particular time relation) to the excitation voltage, in order to obtain a sufficient signal amplitude for the evaluation.

A further solution possibility according to the present state of the art is to perform a calculation of the current angle, from values determined beforehand for $U_S(t)$ and $U_C(t)$, in an assembly preferably implemented as an integrated circuit, by means of phase-locked loops (PLL). A consequent disadvantage here is that so-called lag errors arise in PLL circuits with changing angular velocities. If angular accelerations are too great, the PLL no longer runs synchronously, and a suitable signal for determining an angle can no longer be found.

BRIEF SUMMARY OF THE INVENTION

It is the object of the present invention to specify an assembly and a method for determining the angular position, in which assembly and method the aforementioned disadvantages are avoided.

The object is achieved with an assembly for determining a current angular position of an object rotating around a stationary point. The assembly includes an inductive sensor with at least one primary winding being fed an excitation signal and at least two secondary windings inductively coupled thereto. The inductive coupling causes signals to be generated with a periodic and phase-shifted waveform in the two secondary windings depending on a rotation angle. The at least two secondary windings include a first secondary winding and a second secondary winding. The assembly further has three phase shifters each with one input and one output, and the phase shifters have the same phase shifts. The phase shifters each are electrically coupled on the input with the primary winding, the first secondary winding or the second secondary winding respectively. An evaluation unit is provided for determining the current angular position from the signals at the inputs and at the outputs of the phase shifters.

The object is achieved in particular by an assembly and a method for determining the angular position by means of an inductive sensor, in which assembly and method three further signals are formed from the excitation signal of the primary winding of the sensor and the signals tapped in its secondary windings by phase shifter units, and are supplied after a sampling to an evaluation circuit which has for example polarity sign determination units. For example, in the evaluation circuit, the current angular position of the rotating machine can be determined at any time, for example using an appropriate calculation rule, from the now six available values, without the aforementioned disadvantages appearing.

The invention will now be described in detail with reference to the embodiments represented in the figures of the drawings, in which

DESCRIPTION OF THE INVENTION

Figure 1:
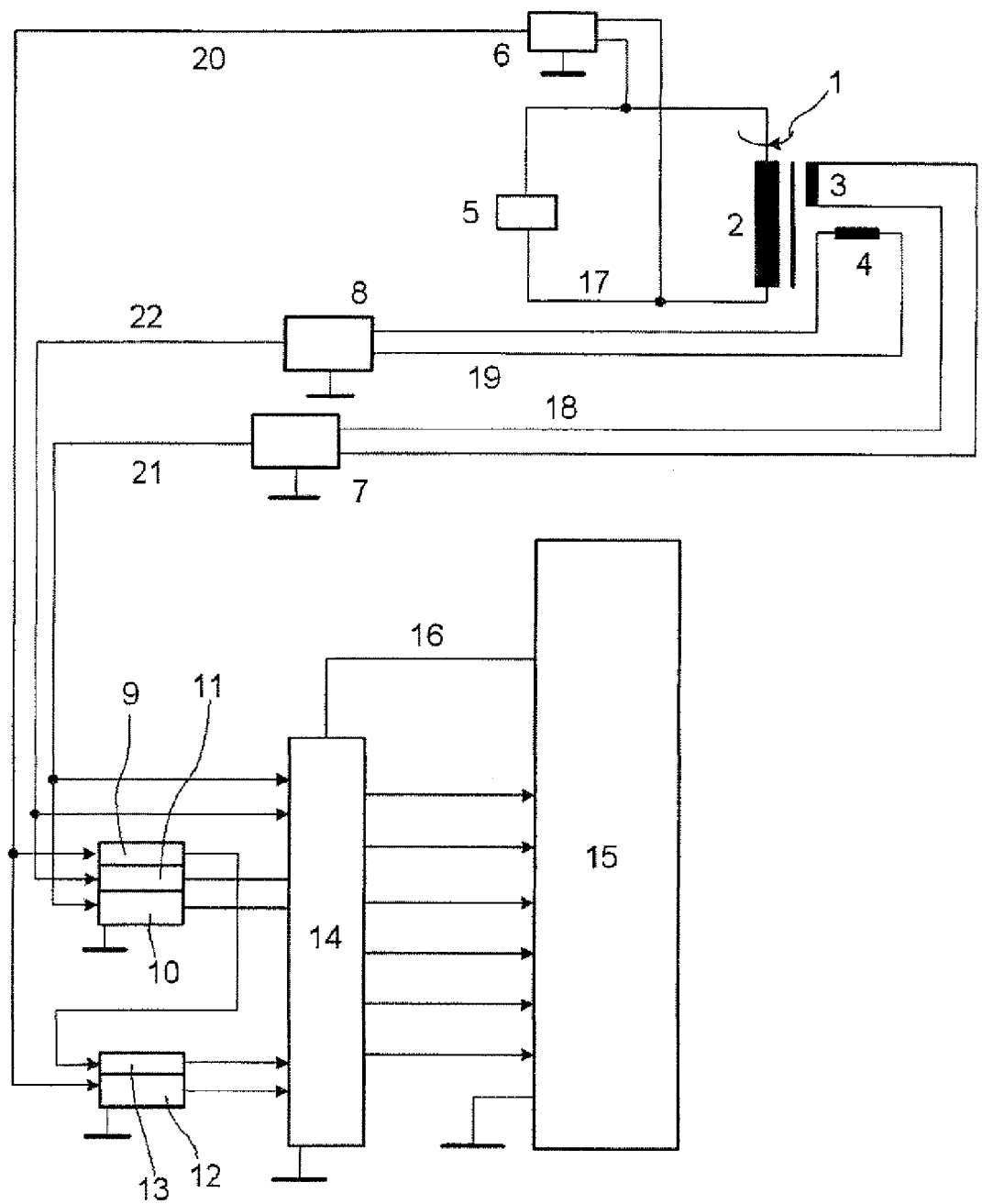
FIG. 1 shows in a block diagram an embodiment of the assembly according to the invention.

FIG. 1 shows in a block diagram an embodiment of the assembly according to the invention. The associated method for determining the angular position is explained with reference to the mathematical relations which are usually present on a resolver/VR sensor, but it can be applied to any sensor as initially mentioned. The assembly in the example has an inductively coupled angle sensor 1, which has at least one primary input winding 2 and at least two secondary output windings 3 and 4, the inductive coupling between the primary side and the two secondary sides having a sinusoidal or cosinusoidal waveform, depending on the rotation angle of a rotating machine which is not shown in any further detail. A customary resolver is described here as an example.

The assembly further possesses a generator unit 5 for excitation of the primary winding 2 with an excitation voltage 17 which is generally temporally sinusoidal. The assembly further possesses three subtractor units 6, 7 and 8, three phase shifters 9, 10 and 11, two polarity sign determination units 12 and 13, a sample and hold unit 14 provided for signal sampling, and a processor 15.

As shown in FIG. 1, the generator unit 5 is connected to the primary winding 2 and the subtractor unit 6. The connections of the secondary winding 3 are connected to inputs of the subtractor unit 7. The connections of the secondary winding 4 are connected to inputs of the subtractor unit 8. The output of the subtractor unit 6 is coupled with the input of the phase shifter 9 and with the input of the polarity sign determination unit 12. The output of the subtractor unit 7 is coupled with the input of the phase shifter 10 and with an input of the sample and hold sampling unit 14. The output of the subtractor unit 8 is coupled with the input of the phase shifter 11 and with an input of the sample and hold sampling unit 14. The output of the phase shifter 9 is coupled with the input of the polarity sign determination unit 13. Finally, the outputs of the phase shifters 10 and 11 and the outputs of the polarity sign determination units 12 and 13 are coupled with further inputs of the sample and hold sampling unit 14.

A sinusoidal voltage 17 fed from the generator unit 5 into the primary winding 2 generates via electromagnetic coupling a floating sinusoidal voltage 18 in the secondary winding 3 and a floating sinusoidal voltage 19 in the secondary winding 4, the amplitude of 18 being modulated as a function of the rotation angle according to a sine function and the amplitude of 19 being modulated as a function of the rotation angle according to a cosine function, i.e. according to the terminal relationships on a resolver or a variable reluctance sensor respectively. By means of the subtractor unit 6, the sinusoidal excitation voltage 17 is converted into a sinusoidal excitation voltage 20 referred to ground. By means of the subtractor unit 7, the temporally sinusoidal voltage 19 of the secondary winding 3 is converted into a temporally sinusoidal voltage 21 referred to ground of the assembly.

By means of the subtractor unit 8, the temporally sinusoidal voltage 20 of the secondary winding 4 is converted into a temporally sinusoidal voltage 22 referred to ground.

Furthermore, the temporally sinusoidal excitation voltage 20 referred to ground is shifted in phase by the phase shifter 9 through 90 degrees, the temporally sinusoidal signal 21 is shifted in phase by the phase shifter 10 through 90 degrees, and the temporally sinusoidal signal 22 is shifted in phase by the phase shifter 11 through 90 degrees. In the polarity sign determination unit 12, a signal is generated with value 1 when the excitation signal 20 is greater than zero, otherwise a signal with value 0 is generated. In the polarity sign determination unit 13, a signal is generated with value 1 when the excitation signal of the phase shifter 9, referred to ground and shifted in phase through 90 degrees, is greater than zero, otherwise a signal with value 0 is generated.

In the sample and hold sampling unit 14, samples of the signals supplied from the subtractor units 7 and 8, the phase shifters 10 and 11 and the polarity sign determination units 12 and 13 are formed at the time of receiving a trigger signal 16 from the processor 15. These six signals are supplied for further processing to the processor 15 as a computing device, which calculates therefrom the current angular position of the rotating machine at the time of receipt of the trigger signal 16 by the sample and hold unit 14. The current angular position is for example calculated as $$\alpha = \arctan(ab_1/ab_2) + \pi \cdot \text{sign}(ab_2) \cdot VZ\_EXITS,$$

if a value G1 is greater than or equal to a value G2, and as $$\alpha = \arctan(ab_3/ab_4) + \pi \cdot \text{sign}(ab_4) \cdot VZ\_EXITE90,$$

if G1 is smaller than G2. Here $\alpha$ denotes the current angular position of the rotating machine, $\pi$ pi (e.g. 3.14159), VZ_EXITS the sampled signal value of the first polarity sign determination unit 12 and VZ_EXITE90 the sampled signal value at the output of the second polarity sign determination unit 13. The value $G1 = ab_1^2 + ab_2^2$ and the value $G2 = ab_3^2 + ab_4^2$, where $ab_1$ is the sampled signal value at the output of the subtractor unit 7, $ab_2$ is the sampled signal value at the output of the subtractor unit 8, $ab_3$ is the sampled signal value at the output of the phase shifter 10 and $ab_4$ is the sampled signal value at the output of the phase shifter 11. By means of the selection of ($ab_1$; $ab_2$) or ($ab_3$; $ab_4$) based on G1 and G2, a signal which can readily be evaluated can always be accessed. This allows the mentioned disadvantages according to the state of the art to be avoided, and the current angular position of a rotating machine to be calculated at any time without lag errors. Thus for example with a phase shift of 90 degrees (and odd-numbered multiples thereof), a maximum (positive or negative) is when the original signal is zero.

Figure 2A:
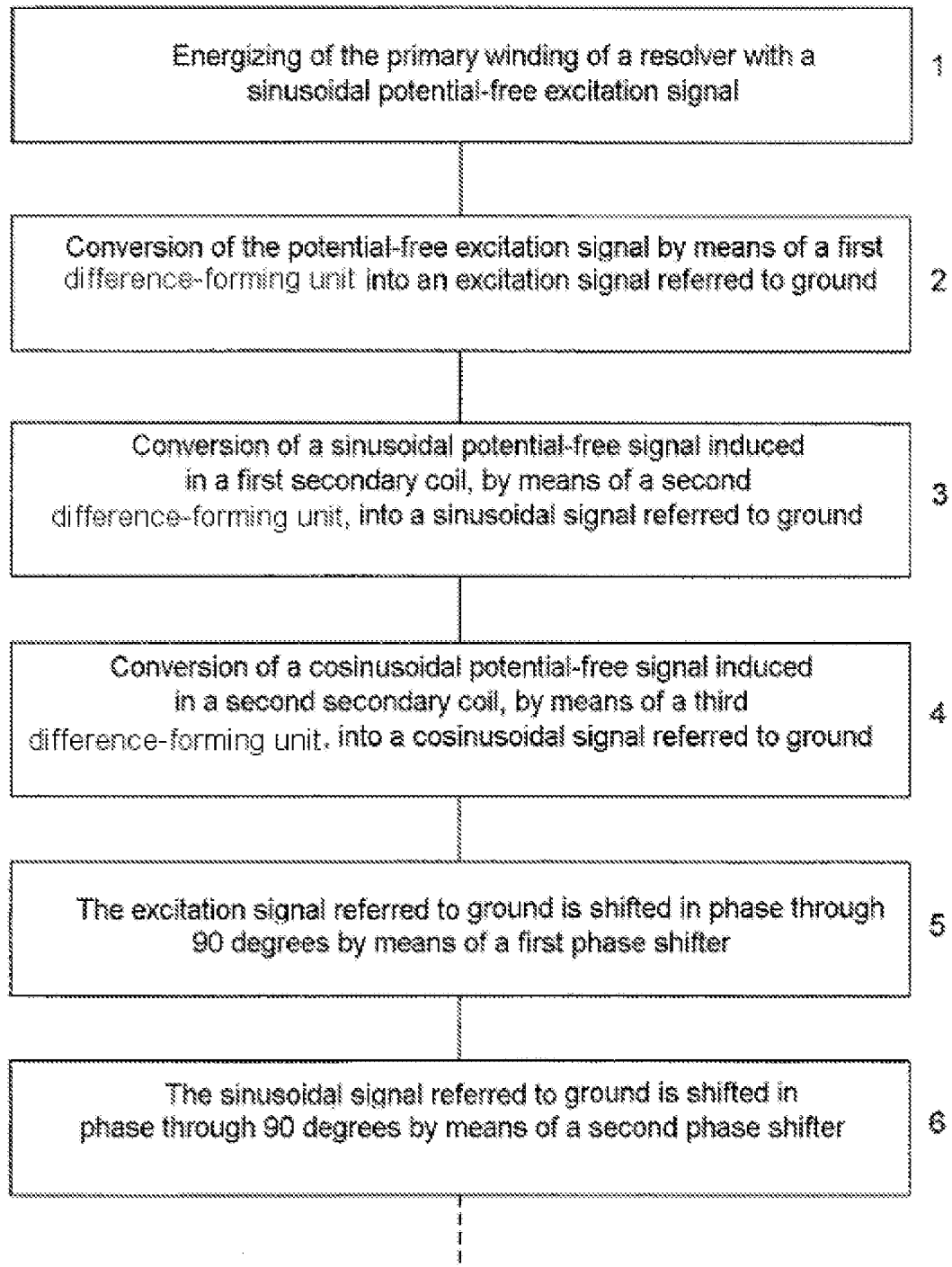
FIG. 2 shows in a flow diagram, an embodiment of the method according to the invention.
Figure 2B:
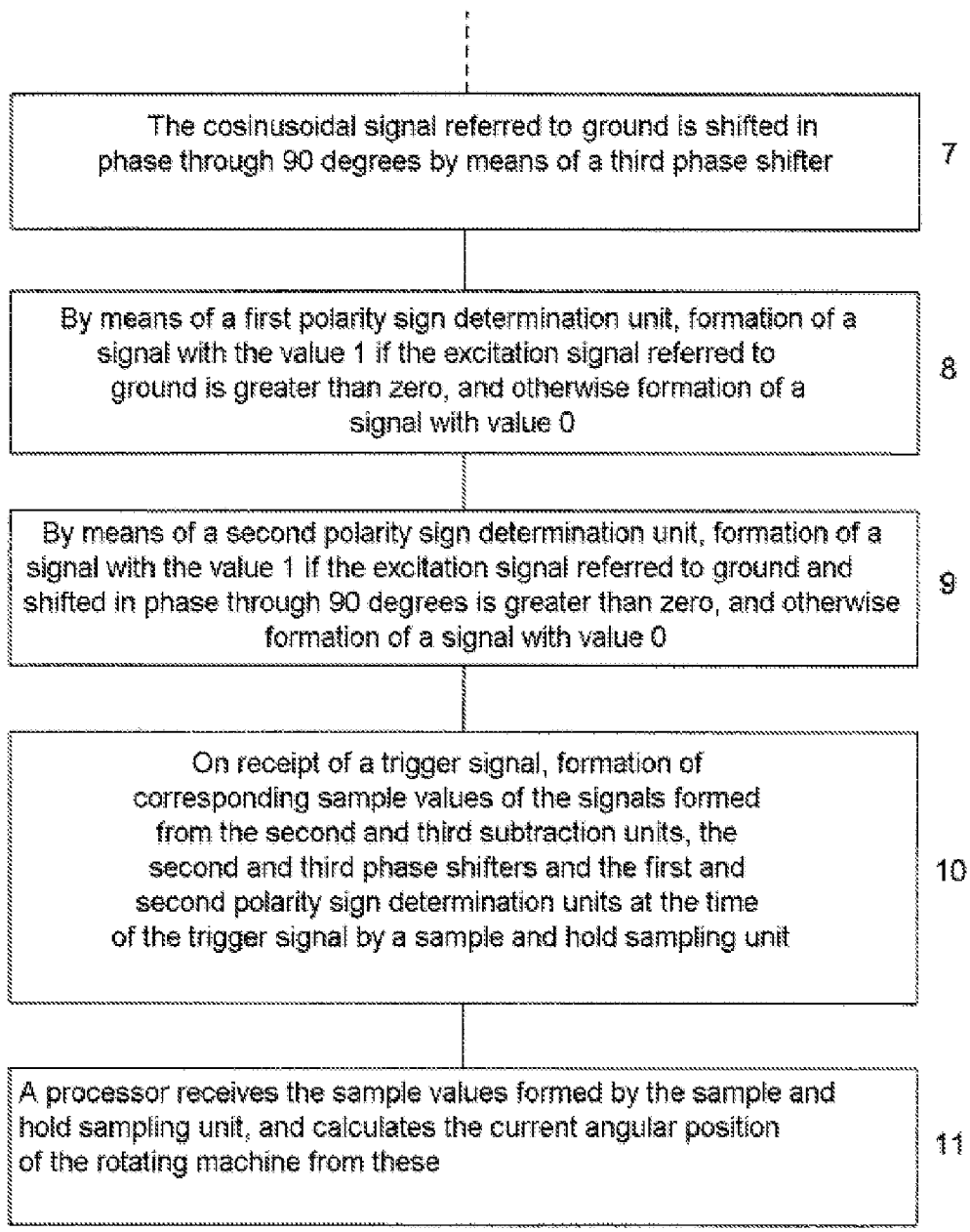

FIGS. 2a and 2b show as an example a flow diagram of the method for determining the current angular position of a rotating machine. In a step 1, a primary winding of a resolver is energized with a temporally sinusoidal excitation signal. In a step 2, this excitation signal is converted by means of a first subtractor unit into an excitation signal referred to ground. In a step 3, a temporally sinusoidal floating signal induced in a first secondary coil of the resolver is converted by means of a second subtractor unit into a temporally sinusoidal signal referred to ground. In a step 4, a temporally sinusoidal floating signal induced in a second secondary coil of the resolver is converted by means of a third subtractor unit into a temporally sinusoidal signal referred to ground.

In a step 5 of the method, the excitation signal referred to ground is shifted in phase through 90 degrees by means of a first phase shifter. In a step 6, the temporally sinusoidal signal referred to ground is shifted in phase through 90 degrees by means of a second phase shifter. The temporally sinusoidal signal referred to ground is shifted in phase through 90 degrees by means of a third phase shifter in a step 7. By means of a first polarity sign determination unit, in step 8 a signal with the value 1 is formed if the excitation signal referred to ground is greater than zero, otherwise a signal with value 0 is generated. In a step 9, by means of a second polarity sign determination unit, a signal is generated with value 1 when the excitation signal, referred to ground and shifted in phase through 90 degrees, is greater than zero, otherwise a signal with value 0 is generated.

In a step 10 of the method, sample values of the signals formed from the second and third subtractor units, the second and third phase shifters and the first and second polarity sign determination units are formed at the time of the trigger signal by a sample and hold unit on receipt of a trigger signal, the point in time of which is freely selectable. In a step 11, the sample values formed by the sample and hold sampling unit are received by a processor, and the current angular position of the rotating machine is calculated from these sample values according to the mathematical procedure described above.

In the present method described as an example, the order shown for the steps is not mandatory, and can be varied as desired. In the previously explained example of an assembly according to the invention, the subtractor units 6, 7, and 8 can also be omitted, for example, if a floating measured value acquisition is not required.

The invention claimed is:

1. An assembly for determining a current angular position of an object rotating around a stationary point, the assembly comprising:

an inductive sensor having at least one primary winding being fed an excitation signal and at least two secondary windings inductively coupled thereto, said inductive coupling causing signals to be generated with a periodic and phase-shifted waveform in said two secondary windings depending on a rotation angle, said at least two secondary windings including a first secondary winding and a second secondary winding;

three phase shifters each with one input and one output, said phase shifters having same phase shifts, each being electrically coupled on said input with said primary winding, said first secondary winding or said second secondary winding respectively; and an evaluation unit for determining the current angular position from the signals at said inputs and at said outputs of said phase shifters.

2. The assembly according to claim 1, wherein the excitation signal is temporally sinusoidal and in said first secondary winding a temporally sinusoidal modulated signal is induced, whose amplitude is modulated in dependence on a rotation angle of a rotating machine according to a sine function, and in said second secondary winding a temporally sinusoidal signal is induced, whose amplitude is modulated in dependence on the rotation angle of the rotating machine according to a cosine function.

3. The assembly according to claim 2, wherein said evaluation unit contains:

a first polarity sign determination unit configured to generate a first sign signal which indicates if the excitation signal is less than zero;

a second polarity sign determination unit configured to generate a second sign signal which indicates if a phase-shifted excitation signal is less than zero;

a sample and hold unit configured, on receipt of a trigger signal to form corresponding sample values from the signals which are not phase shifted and the signals being phase shifted by means of said phase shifters, of said first and second secondary windings, and from output signals of said first and second polarity sign determination units at a time of receiving the trigger signal; and a computing device set up to generate the trigger signal for said sample and hold unit and to calculate the current angular position of the rotating machine from sample values formed by said sample and hold unit.

4. The assembly according to claim 3, wherein said computing device is set up to calculate the current angular position according to:

$\alpha = \arctan(ab_1/ab_2) + \pi \cdot \mathrm{sign}(ab_2) \cdot \mathrm{VZ\_EXITE}$, if a value G1 is greater than or equal to a value G2; or as $\alpha = \arctan(ab_3/ab_4) + \pi \cdot \mathrm{sign}(ab_4) \cdot \mathrm{VZ\_EXITE90}$, if G1 is smaller than G2;

where $\alpha$ is the current angular position;
the value $G1 = ab_1^2 + ab_2^2$;
the value $G2 = ab_3^2 + ab_4^2$;
VZ_EXITE is a sampled signal value of said first polarity sign determination unit;
VZ_EXITE90 is a sampled signal value of said second polarity sign determination unit;
$ab_1$ is a sampled signal value of said first secondary winding;
$ab_2$ is a sampled signal value of said second secondary winding;
$ab_3$ is a sampled signal value of said output of a first phase shifter of said phase shifters; and
$ab_4$ is a sampled signal value of said output of a second phase shifter of said phase shifters.

5. The assembly according to claim 3,
wherein the signals of said primary winding and of said secondary windings are floating;
further comprising a first subtractor unit configured to convert the excitation signal into an excitation signal referred to ground;
further comprising a second subtractor unit configured to convert the temporally sinusoidal modulated signal of said first secondary winding into a signal referred to ground; and
further comprising a third subtractor unit configured to convert the temporally sinusoidal signal of said second secondary winding into a signal referred to ground.

6. The assembly according to claim 1, further comprising a generator unit connected to said primary winding, said generator unit generating the excitation signal.

7. The assembly according to claim 1, wherein the phase shift of all said phase shifters amounts to 90 degrees or an odd-numbered multiple thereof.

8. A method for determining a current angular position of an object rotating around a stationary point, by means of an inductive sensor having at least one primary winding fed with an excitation signal, and at least two secondary windings inductively coupled thereto, the inductive coupling causing signals to be generated with a periodic and phase-shifted waveform in the two secondary windings depending on a rotation angle, which comprises the steps of:

phase shifting the signals from the primary winding and the two secondary windings by a same phase shift; and determining the current angular position from the signals, non-phase-shifted and phase shifted, from the primary winding and the two secondary windings.

9. The method according to claim 8, wherein the excitation signal is temporally sinusoidal and performing the following steps:

inducing in a first secondary winding of the two secondary windings a temporally sinusoidal modulated signal, whose amplitude is modulated in dependence on the rotation angle of a rotating machine according to a sine function; and inducing in a second secondary winding of the two secondary windings a temporally sinusoidal signal, whose amplitude is modulated in dependence on the rotation angle of the rotating machine according to a cosine function.

10. The method according to claim 9, which further comprises:

generating a first sign signal which indicates if the excitation signal is less than zero;

generating a second sign signal which indicates if a phase-shifted excitation signal is less than zero;

generating trigger signals;

on receipt of the trigger signals, forming corresponding sample values from the signals, non-phase-shifted and phase shifted, from the first and second secondary windings and the first and second sign signals; and calculating the current angular position of the rotating machine from the corresponding sample values.

11. The method according to claim 10, which further comprises calculating the current angular position as follows:

$\alpha = \arctan(ab_1/ab_2) + \pi \cdot \mathrm{sign}(ab_2) \cdot \mathrm{VZ\_EXITE}$, if a value G1 is greater than or equal to a value G2; or $\alpha = \arctan(ab_3/ab_4) + \pi \cdot \mathrm{sign}(ab_4) \cdot \mathrm{VZ\_EXITE90}$, if G1 is smaller than G2, where $\alpha$ is the current angular position;
the value $G1 = ab_1^2 + ab_2^2$;
the value $G2 = ab_3^2 + ab_4^2$;

VZ_EXITE is a sampled signal value of the first sign signal;

VZ_EXITE90 is a sampled signal value of the second sign signal;

$ab_1$ is a sampled signal value of the first secondary winding;

$ab_2$ is a sampled signal value of the second secondary winding;

$ab_3$ is a sampled signal value of an output of a first phase shifter; and $ab_4$ is a sampled signal value of an output of a second phase shifter.

12. The method according to claim 8, which further comprises phase shifting the signals to the primary winding and from the two secondary windings through 90 degrees or an odd-numbered multiple thereof.

* * * * *